United States Patent [19]

Reed

[11] 4,364,234

[45] Dec. 21, 1982

[54] CONTROL CIRCUITRY FOR THERMOELECTRIC ENVIRONMENTAL CHAMBER

[75] Inventor: Michael A. Reed, Tucson, Ariz.

[73] Assignee: Koolatron Industries, Ltd., Ontario, Canada

[21] Appl. No.: 247,634

[22] Filed: Mar. 25, 1981

[51] Int. Cl.³ .................... F25B 21/02; G01K 13/00
[52] U.S. Cl. .................................... 62/3; 62/130; 62/324.2; 165/26
[58] Field of Search ................... 62/3, 126, 130, 159, 62/160, 324.2; 165/26, 11 R; 236/94

[56] References Cited

U.S. PATENT DOCUMENTS

| | | | |
|---|---|---|---|
| 3,232,063 | 1/1966 | Eichhorn et al. | 62/3 |
| 3,332,807 | 7/1967 | Boehmer et al. | 62/3 |
| 3,616,846 | 11/1971 | Wills | 165/26 |
| 3,733,836 | 5/1973 | Cormi | 62/3 |
| 4,187,093 | 2/1980 | Boratgis et al. | 62/126 |
| 4,313,308 | 2/1982 | Boratgis et al. | 165/26 |

Primary Examiner—Albert J. Makay
Assistant Examiner—Harry Tanner
Attorney, Agent, or Firm—Cahill, Sutton & Thomas

[57] ABSTRACT

Circuitry for controlling the temperature of a thermoelectric environmental chamber includes a pair of digital switches for selecting any desired temperature between −10 degrees C. +79 degrees C., the digital slide switches selecting tap points of a group of series connected resistors forming a feedback loop of an operational amplifier. Three resistors connected in series with the output of the operational amplifier and the feedback resistors produce a plurality of voltages that represent upper and lower limits to tolerance range about the selected desired temperature. These voltages are compared by means of a plurality of comparators to a voltage produced in response to a solid state temperature sensor located in the thermal compartment of the environmental chamber. Decoding circuitry decodes the outputs of the comparators to produce signals which control switching devices that control the direction of current through a thermoelectric heat pumping device.

12 Claims, 7 Drawing Figures

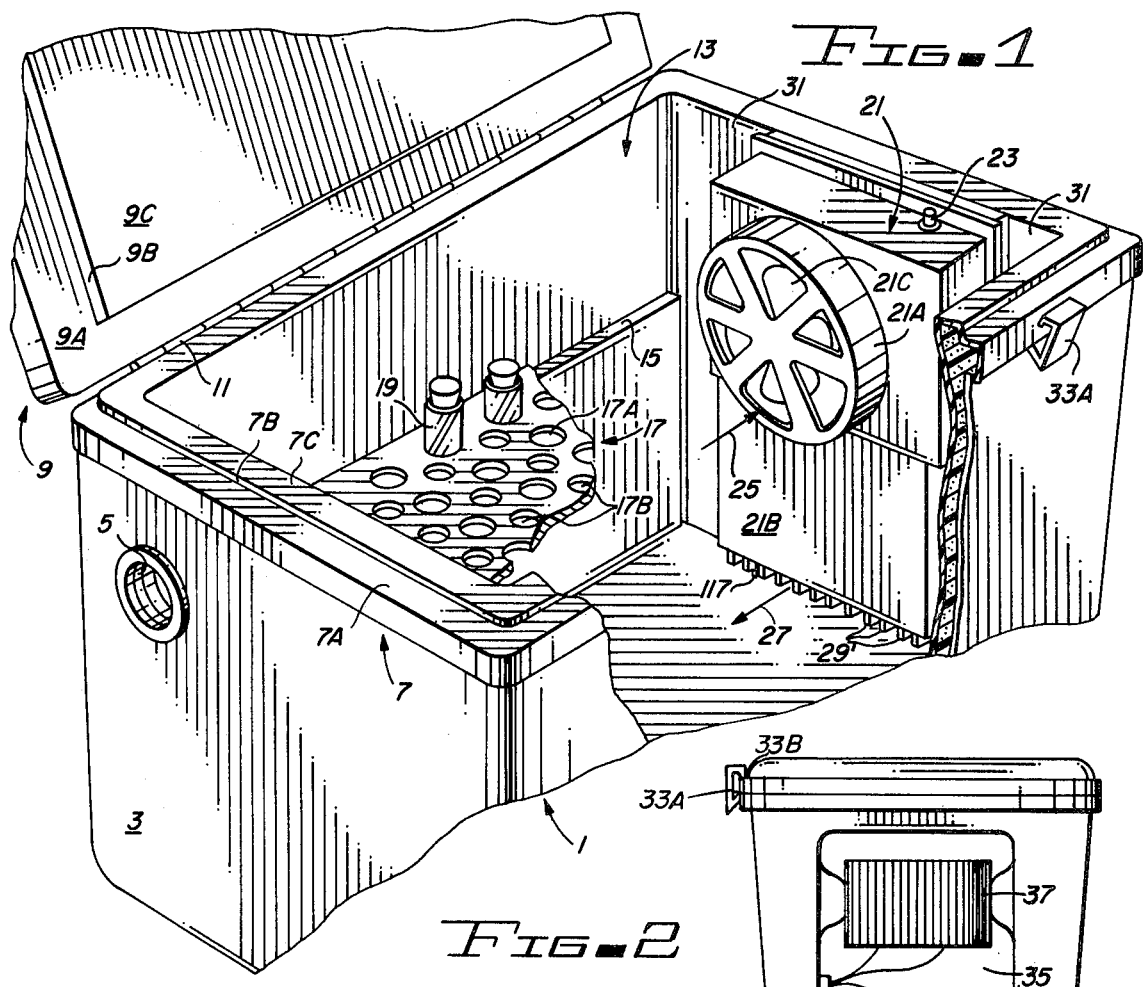
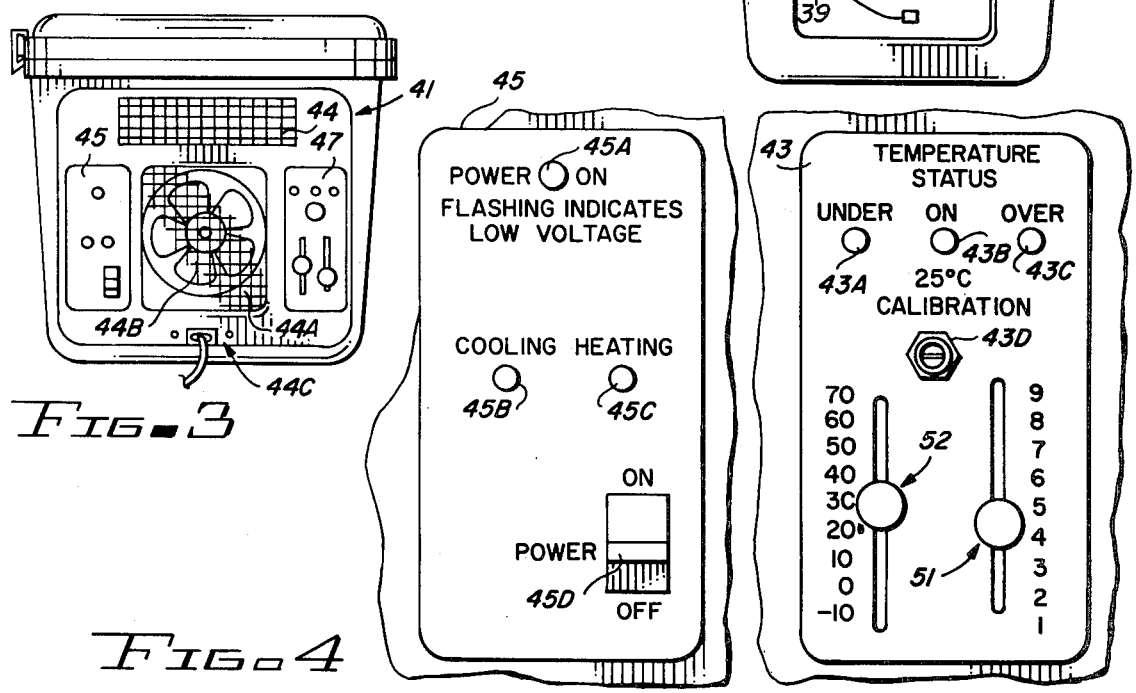

CONTROL CIRCUITRY FOR THERMOELECTRIC ENVIRONMENTAL CHAMBER

BACKGROUND OF THE INVENTION

1. Field of the Invention

The invention relates to environmental chambers, and particularly to environmental chambers which utilize thermoelectric heat pumping devices to maintain a temperature in a thermal compartment of the environmental chamber at a preselected value.

2. Description of the Prior Art

Conventional environmental chambers for thermal testing of various devices or substances have metal inner and outer surfaces, use fiberglass insulation, have large temperature ranges, typically from approximately one hundred degrees centrigrade below zero to over three hundred degrees centigrade above zero. Present environmental chambers typically weigh at least one hundred pounds because of their metal construction and heavy refrigerating mechanisms. The metal construction and use of fiberglass insulation are necessary because of the high temperatures which can be produced by the environmental chambers. Some presently available environmental chambers utilize liquid $CO_2$ contained in heavy metal bottles for achieving low temperatures, bringing the total weight of the system to at least several hundred pounds. If a refrigeration compressor unit is used, the entire system typically weighs at least 250 pounds. Prices of presently known environmental chambers are in the range of at least $800.00 to $2,500.00 for a simple "temperature chamber". Typically, presently known environmental chambers include an analog control that is utilized to "set" a particular desired temperature in the range from approximately minus 100 degrees centigrade to plus 300 degrees centigrade. It usually is impossible to precisely set a desired temperature with such an analog control. The prior art environmental chambers are completely non-portable, are incapable of operating from typical voltages, such as twelve volt batteries, available on vehicles "in the field". Furthermore, prior environmental chambers that utilize electrical resistive heating elements and compressor-type refrigerating systems usually generate large "surges" in the electrical supply system when a heating element or a refrigeration unit thereof is switched on or off during normal operation.

SUMMARY OF THE INVENTION

Briefly described, and in accordance with one embodiment thereof, a circuit is provided for controlling a solid state thermoelectric device in a thermoelectric environmental chamber includes a digital temperature selecting device that controls the amount of resistance in a circuit producing a first current representative of a selected desired temperature in a thermal compartment of the thermoelectric environmental chamber, a circuit responsive to the first current for producing a first voltage representative of a first upper range limit of the selected desired temperature, a circuit responsive to the first current for producing a second voltage representative of a first lower range limit for the selected desired temperature, a temperature sensing device disposed in the thermal compartment for sensing an actual temperature in the thermal compartment and producing a third voltage representative of the actual temperature, a comparator circuit for comparing the third voltage to the first and second voltage to produce first information indicative of whether the actual temperature is above the first upper range limit, below the first lower range limit, or between the first upper and lower range limits, and circuitry responsive to the first digital information for decoupling a solid state thermoelectric heat pumping device from a supply voltage source if the third voltage is between the first and second voltages and controlling the direction of current through the solid state thermoelectric heat pumping device in accordance with whether the third voltage is greater than the first voltage or less than the third voltage. In the described embodiment of the invention the circuits producing the second and third voltages include low value resistors through which the feedback current of an operational amplifier flows. In the described embodiment of the invention, additional low value resistors are provided for producing fourth and fifth voltages representative of a second upper range limit of the selected desired temperature and a second lower range limit of the selected desired temperature. Comparison circuitry is provided for comparing the third voltage to the fourth and fifth voltages to produce second digital information indicating whether the third voltage is between the fourth and fifth voltages, above the fourth voltage, or below the fifth voltage and circuitry responsive to the second digital information for controlling an indicating device that indicates that the actual temperature in the thermal compartment is within a range above the selected desired temperature represented by the fourth and fifth voltages, or is above or below that range.

BRIEF DESCRIPTION OF THE DRAWINGS

FIG. 1 is a partial perspective view of the environmental chamber of the invention with the cover open.

FIG. 2 is one end view of the environmental chamber of FIG. 1.

FIG. 3 is an opposite end view of the environmental chamber of FIG. 1.

FIG. 4 is an enlarged view of the control panels shown in FIG. 3.

DESCRIPTION OF THE INVENTION

Figure 2A:
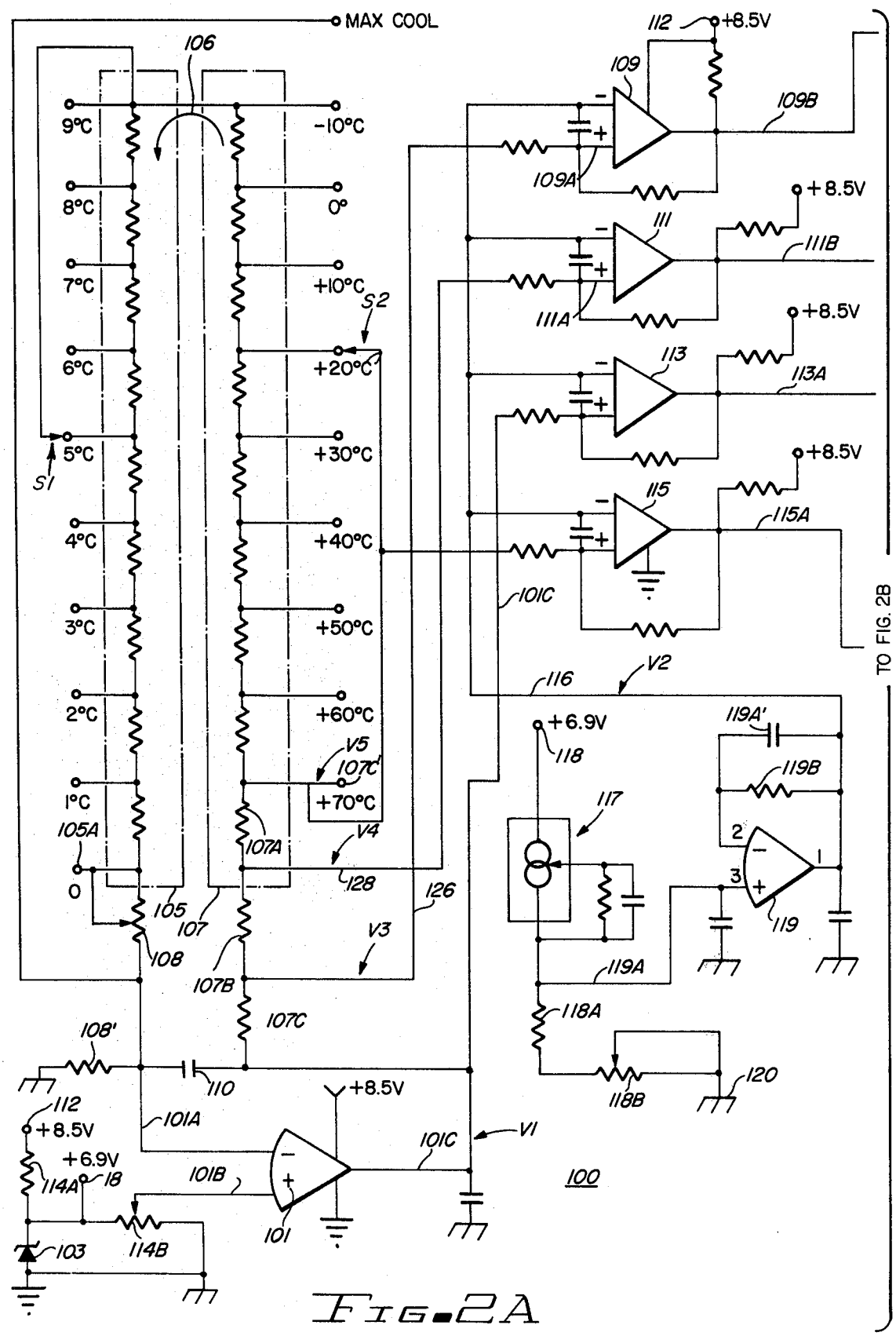
FIGS. 2A and 2B comprise a schematic diagram of the control circuitry for the environmental chamber of FIG. 1.

Referring now to the drawings, particularly FIGS. 1-4, thermoelectric environmental chamber 1 includes a box-shaped housing 3 having two end walls, a front wall, a back wall, a bottom and an openable cover 9 bounding an interior chamber 13, hereinafter referred to as "temperature chamber 13". Box-shaped housing 3 has a top opening into temperature chamber 13. Cover 9 is hingeably attached, by means of hinge 11, to the upper outer edge of the rear wall of housing 3. Temperature chamber 13 is lined with injection molded polyproprolene, which withstands temperatures as high as 79 degrees centigrade in the described embodiment of the invention. The general construction of the housing and lid, including an outside plastic surface composed mainly of ABS plastic, an insulating region between the outer plastic surface and inner injection molded polyproprolene surface filled with urethane foam insulation, is similar to that described in my co-pending patent application entitled "CONTROL CIRCUITRY FOR THERMOELECTRIC COOLER", Ser. No. 102,447 filed Dec. 11, 1979, U.S. Pat. No. 4,301,658 assigned to the present assignee, and incorporated herein by reference.

A port opening is provided in the right end wall for the purpose of allowing electric wires, fluid tubes, manipulating devices and the like to be passed from outside of environmental chamber 1 into temperature chamber 13, in order to provide power to devices being tested inside the temperature chamber 13 or to allow manipulation thereof, or to allow conveying of substances to or from materials being tested inside environmental chamber 1. Suitable insulating tape or plugs can be utilized to cover the portion of port 5 not occupied by such conductors and communicating means.

The upper rim of housing 3 is continuous with the above mentioned injection molded polyproprolene interior liner, and is designated by reference numeral 7. Lip 7 has a flat peripheral surface 7A, an upright edge 7B, and another flat surface 7C which mate, respectively, with surfaces 9A, 9B and 9C of cover 9 to provide a substantially airtight seal when lid 9 is closed and locked in place by latching mechanisms 33A and 33B.

An internal heat exchanger 29 in temperature chamber 13 has a plurality of fins, the lower portions 29' of which are shown (FIG. 1) extending beneath a close fitting portion 21B of a shroud or housing 21 which encloses internal heat exchanger 29 and a fan unit 21B. A fan guard portion 21A of shroud 21 surrounds the blade of fan unit 21B and has openings which allow air to be drawn into shroud 21 in the direction indicated by arrow 25. This air is forced through internal heat exchanger 29 from the upper portion of temperature chamber 13 and forced out of the lower portion 21B in the direction indicated by arrow 27, after the air has been forced past fins 29'. A momentary switch 23 causes fan unit 21B to be continuously turned on if lid 9 is closed, but immediately turns fan unit 21B off if the lid 9 is opened. This allows the temperature to be uniform (to within two degrees) throughout temperature chamber 13 in the range from 0 degrees centigrade to +79 degrees centigrade if the "heat load" of the material or device being tested in environmental chamber 1 is less than roughly 5 to 15 watts in an ambient temperature of approximately 22° C.

The width of shroud 21 is less than the width of temperature chamber 13, thereby leaving spaces 31 clear to allow a long narrow device such as a large printed circuit board to be contained in temperature chamber 13.

A pair of flat, horizontal ledge surfaces 15 provided in the inner front and back wall surfaces provide supports for suitable trays, test tube racks, or other means to conveniently hold devices or substances being tested in temperature chamber 13. By way of example, in FIG. 1, a test tube rack 17 includes large openings 17A for holding test tubes, such as 19, and smaller holes 17B for allowing sufficiently adequate air ventilation to maintain the temperature uniform in temperature chamber 13 (if cover 9 is closed).

Figure 2B:
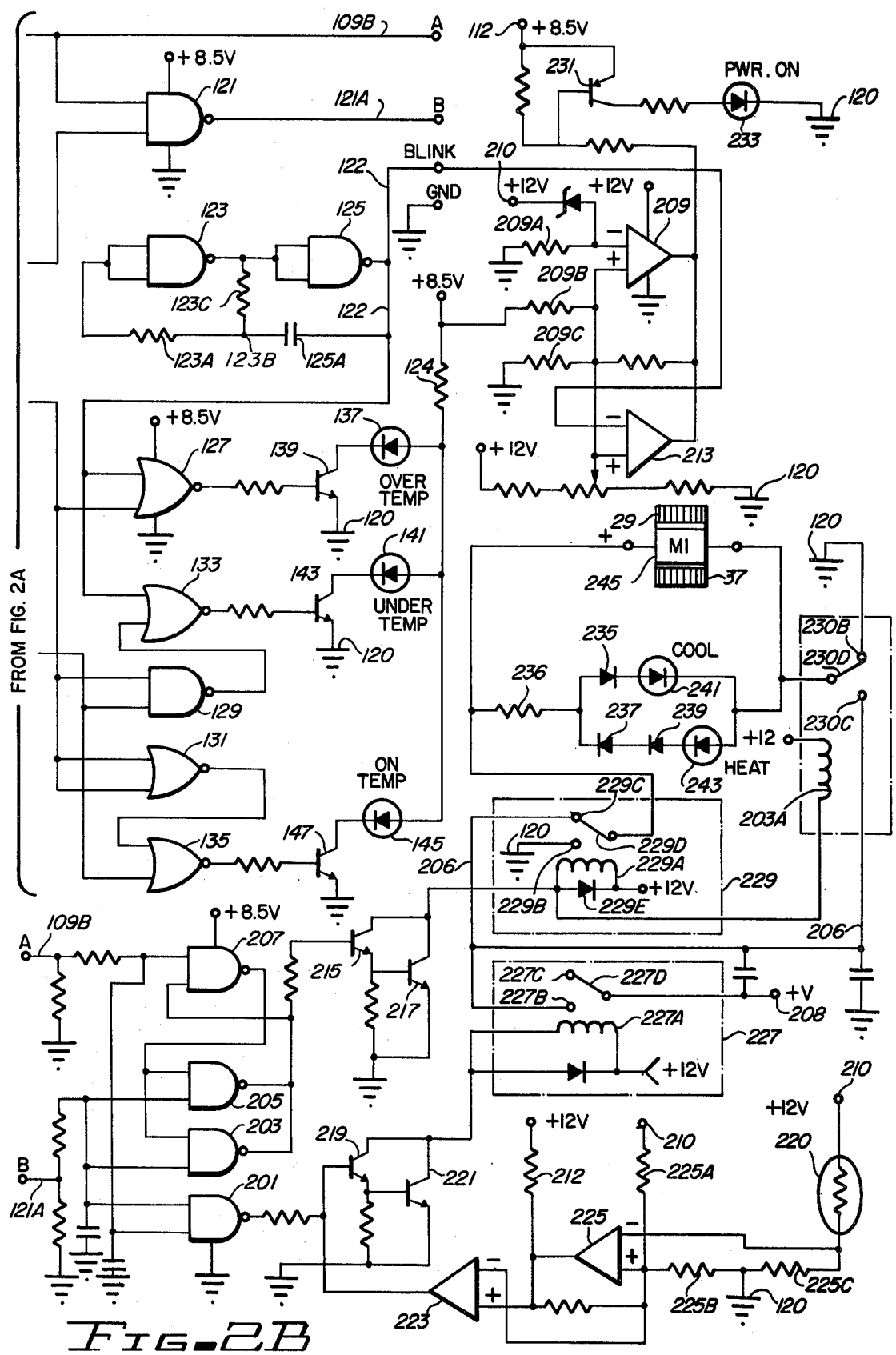
Figure 5:
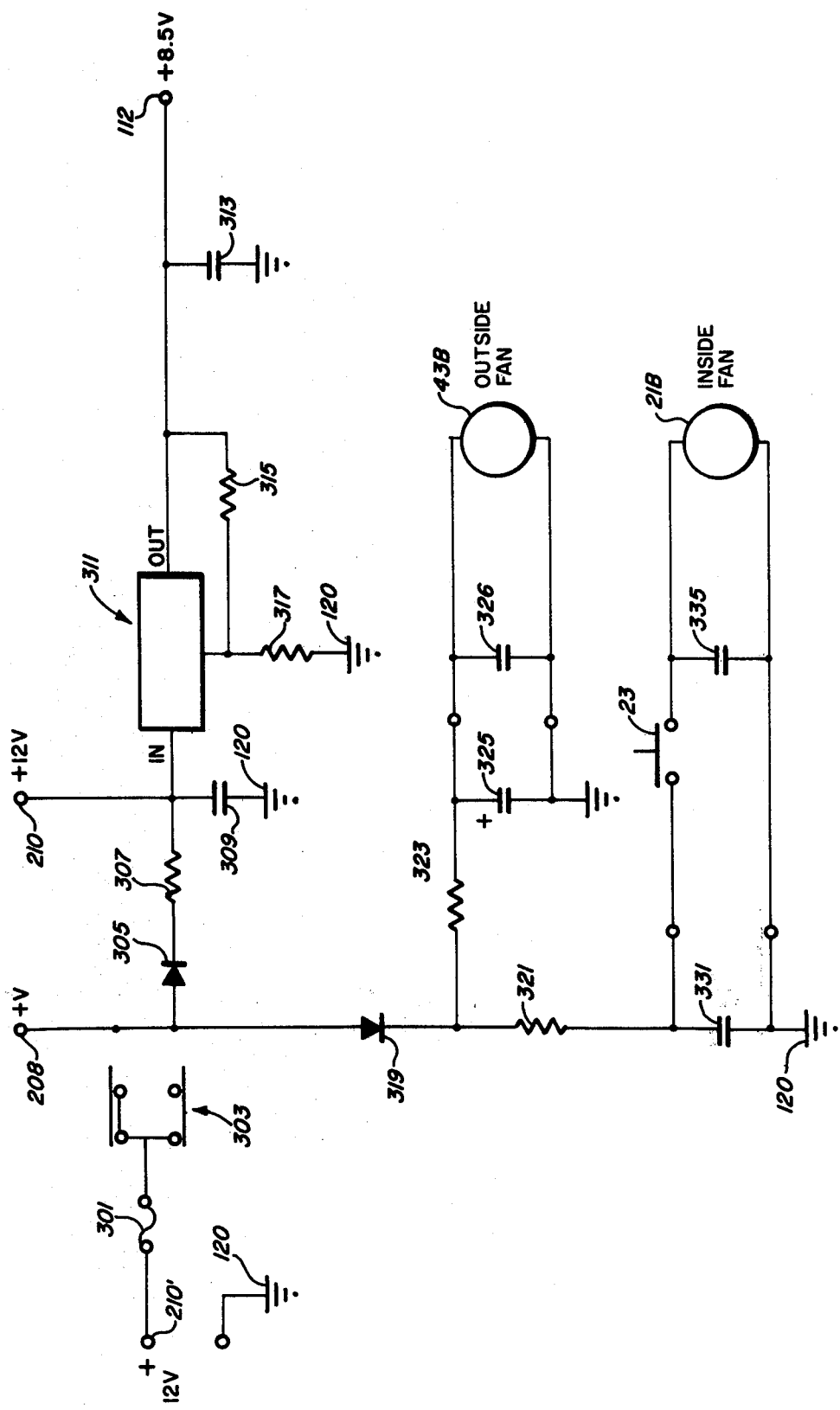
FIG. 5 is a schematic diagram of the power supply circuit for the environmental chamber of FIG. 1.

FIG. 2 shows a recess 35 in the left end of environmental chamber 1 (as shown in FIG. 1) for accommodating external heat exchanger 37 and external fan unit 43B (FIG. 3). Reference numeral 39 designates various conductors which are connected to the control circuitry and power supply shown in FIGS. 2A, 2B and 3. The control circuitry 100, external fan unit 43B, a fan guard 43A, a 12 volt DC power receptical 43C, a power indicator panel 45 and a digital temperature selection panel 43 all are mounted on a plastic panel 41 that covers recess 35, as shown in FIG. 3.

Referring to FIG. 4, indicator panel 45 includes power off/on switch 45D, a cooling indicator 45B which houses light emitting diode 241 in FIG. 2B, a heating indicator 45C which includes light emitting diode 243 in FIG. 2B, and a "power on" indicator 45A which contains light emitting diode 233 in FIG. 2B. On control panel 43, "under range" indicator 43A includes light emitting diode 141 of FIG. 2B, subsequently explained. "On temperature" indicator 43B includes light emitting diode 145 of FIG. 2B. "Over temperature" indicator 43C includes light emitting diode 137 of FIG. 2B.

A calibration control 43D controls the value of variable resistor 118B of FIG. 2A, allowing the circuitry of FIGS. 2A and 2B to be precisely calibrated with, for example, a National Bureau of Standards 25 degree centigrade calibration standard.

Digital slide switch S2 enables a user of environmental chamber 1 to select the "tens" digit of any temperature from minus 10 degrees centigrade to plus 79 degrees centigrade and corresponds to switch S2 in FIG. 2A. Similarly, switch S1 in FIG. 4 is a digital slide switch which enables the user to set the "ones" digit to any value from 1 to 9 degrees centigrade and corresponds to switch S1 in FIG. 2A.

The operation of environmental chamber 1 will be better understood after the circuitry of FIGS. 2A and 2B is explained. Referring now to FIGS. 2A and 2B, circuit 100 includes a first digital switch S1 and a second digital switch S2. Digital switch S1 includes a group 105 of nine 100 ohm resistors connected in series with the negative input of an operational amplifier 101 and a second group 107 of eight 1000 ohm resistors. The successive junctions between successive ones of these groups of resistors serve as tap points for the wiper conductors of switches S1 and S2, respectively. Three 51 ohm resistors 107A, 107B, and 107C are connected in series with resistors 107. A variable 2000 ohm resistor 108 is connected between terminal 105A and negative input 101A of operational amplifier 101. The three 51 ohm resistors 107A, 107B and 107C are connected in series between conductor 107C' of resistor group 107 and output conductor 101C of operational amplifier 101. A bypass capacitor 110 is connected between negative input 101A and output 101C of operational amplifier 101. A reference circuit including a zener diode 103 and resistors 114A and variable resistor 114B are connected to the positive input 101B of operational amplifier 101. Thus, it is seen that groups of resistors 105 and 107 which cooperate with switches S1 and S2 are included in a feedback loop of operational amplifier 101.

Circuit 100 also includes four comparators 109, 111, 113, and 115. The negative input of each of comparators 109, 111, 113 and 115 is connected to conductor 116. Conductor 116 is connected to the output of operational amplifier 119. The negative input of operational amplifier 119 is connected by means of a feedback circuit including capacitor 119A' and resistor 119B to conductor 116. The voltage on conductor 116 is designated V2. The positive input of operational amplifier 119 is connected to one terminal of solid state Kelvin temperature sensing unit 117. Another terminal of temperature sensing unit 117 is connected to supply voltage conductor 118, on which a 6.9 volt supply voltage is conducted.

Conductor 119A is connected by means of a precision 43.2 kilohm resistor 118A and a resistor 118B to ground conductor 120. Resistor 118B is a precision adjustable resistor that can be utilized to calibrate thermoelectric temperature chamber 1 to a precision National Bureau of Standards 25 degree Centigrade standard reference.

Note that the wiper of switch S1 is connected to the junction between resistor groups 105 and 107 and the wiper of switch S2 is connected to conductor 107C'. The wiper of adjustable resistor 108 is connected to conductor 105A, to provide an offset voltage adjustment.

The positive input of comparator 109 is connected by means of a 5.1 kilohm resistor to the junction between 51 ohm resistors 107B and 107C. The positive input of comparator 111 is similarly coupled to conductor 128, which is connected to the junction between resistors 107A and 107B. The positive input of comparator 113 similarly is coupled to conductor 101C. The positive input of comparator 115 is similarly coupled to conductor 107C'.

The output of comparator 109 is connected to conductor 109B, on which a digital signal A is produced. The output of comparator 111 is connected to conductor 111B. Conductor 111B is connected to one input of NAND gate 121, the other input of which is connected to conductor 109B. The output of NAND gate 121 is connected to conductor 121A, on which a digital signal B is produced. By way of definition digital signals A and B are considered to be a single information signal.

The output of comparator of 113 is connected to conductor 113A, which is connected to one input of two-input NOR gate 127 and to both inputs of two-input NOR gate 131 (which functions as an inverter) and one input of two-input NAND gate 129. The other input of NOR gate 127 is connected to conductor 122, which is also connected to one input of two-input NOR gate 133 and to the output of two-input NAND gate 125.

Both inputs of NAND gate 125 are connected to the output of two-input NAND gate 123, both inputs of which are connected by means of a 2.2 megohm resistor 123A to conductor 123B. Conductor 123B is connected by means of resistor 123C to the output of NAND gate 123. Conductor 123B is also connected by means of capacitor 125A to conductor 122. NAND gates 123 and 125 function as inverters. In combination, "inverters" 123 and 125, resistors 123A and 123C, and capacitor 125A function as a monostable multivibrator which toggles at a slow rate, producing a signal BLINK on conductor 122. This signal BLINK is applied to one input of each of two-input NOR gates 127 and 123. The output of two-input NOR gate 127 is coupled by means of a 10 kilohm resistor to the base of NPN transistor 139, the emitter of which is connected to ground conductor 120. The collector of transistor 139 is connected to the cathode of red light emitting diode 137, the anode of which is coupled by means of resistor 124 to 8.5 volt supply voltage conductor 112. The output of NOR gate 133 is coupled by means of a 10 kilohm resistor to the base of NPN transistor 143, the emitter of which is connected to ground conductor 120 and the collector of which is connected to the cathode of red light emitting diode 141. The collector of red light emitting diode 141 is coupled by means of resistor 124 to 8.5 volt conductor 112.

The output of NOR gate 131, which functions as an inverter, is connected to one input of two-input NOR gate 135. The output of NOR gate 135 is coupled by means of a 10 kilohm resistor to the base of NPN transistor 147, the emitter of which is connected to ground conductor 120 and the collector of which is connected to green light emitting diode 145. The other input of NOR gate 135 is connected to conductor 115A, which is connected to the output of comparator 115 and to the other input of two-input NAND gate 129.

The circuit including comparators 209, and 213, PNP transistor 231, and light emitting diode 233 constitute a circuit which indicates when the 12 volt power supply to which thermoelectric temperature chamber 1 is connected is turned on, and also causes light emitting diode 233 to blink at the frequency of the signal BLINK if the supply voltage falls below a predetermined level. One skilled in the art will be able to easily ascertain the operation of this circuitry, and therefore such operation will not be set forth in detail.

Conductor 109B, on which digital signal A is produced, is applied to one input of two-input AND gate 207. The output of two-input NAND gate 207 is connected to one input of each of two-input NAND gates 203 and 205. Conductor 121A, on which the digital signal B is produced, is coupled to the other input of NAND gate 205 and also to one input of two-input NAND gate 201, the other input of which is coupled to conductor 109B. The output of NAND gate 205 is connected to the other input of NAND gate 207 and also to the output of NAND gate 203. The output of NAND gate 205 is also coupled to the base of NPN transistor 215. NPN transistors 215 and 217 constitute a darlington pair, the output of which is connected to a relay coil 229A of relay 229. Relay coil 229A is connected in parallel with relay coil 230A of relay 230. Terminal 229B of relay 229 is connected to ground conductor 120. Terminal 229C of relay 229 is connected to conductor 206. Diode 229E is connected across the coils 229A and 230A to function as a surge protection. Conductor 206 is connected to terminal 230C of relay 230 and terminal 229C of relay 229. Wiper 229D of relay 229 normally contacts terminal 229C and contacts terminal 229B when coil 229A is actuated. Wiper 230D of relay 230 normally contacts terminal 230B of relay 230, and contacts terminal 230C if coil 230A is actuated.

Wiper 229D is connected to the positive terminal of thermoelectric module 245. The negative terminal of thermoelectric module 245 is connected to wiper 230D of relay 230. Wiper 229D is also coupled by means of 500 ohm resistor 236 to the anode of diode 235 and the cathode of diode 237. The cathode of diode 235 is connected to the anode of light emitting diode 241, which indicates when thermoelectric module 245 is operating in a cooling mode. The cathode of light emitting diode 241 is connected to wiper 230D. The anode of diode 235 is connected to the cathode of diode 239. The anode of diode 239 is connected to the cathode of light emitting diode 243, which indicates when thermoelectric module 245 is operating in a heating mode to heat the interior of thermoelectric temperature chamber 1. The anode of light emitting diode 243 is connected to wiper 230D.

High temperature thermister 220 is attached to the external heat exchanger 37 for the purpose of determining when external heat exchanger 37 becomes overheated (for example, because of inadvertently blocked ventilation).

A first terminal of thermistor 220 is connected to 12 volt supply conductor 210, and the second terminal of thermistor 220 is connected to the negative input of comparator 225. The other input of comparator 225 is connected to the junction between a 10 kilohm resistor 225A and a 10 kilohm resistor 225B coupled in series between 12 volt conductor 210 and a ground conductor 120. The second terminal of thermistor 220 is also coupled by 10 kilohm resistor 225C to ground conductor 120.

The output of comparator 225 is coupled by 10 kilohm resistor 212 to 12 volt supply conductor 210 and is also connected to the positive input of comparator 223. The output of comparator 223 is connected to the base of NPN transistor 219, which is the input transistor of a darlington pair including NPN transistor 221. If the temperature of the external heat exchanger of thermoelectric temperature chamber 1 exceeds a certain level, the output of comparator 223 electrically grounds the base of transistor 219, electrically decoupling thermoelectric module 245 from the +V voltage source conductor 208.

Operational amplifiers 101 and 119 can be implemented by means of National Semiconductor LM358 integrated unit operational amplifiers. Comparators 109, 111, 113, 115, 209, 213, 223 and 235 can all be implemented by means of National Semiconductor LM339 integrated circuit comparators.

Referring now to FIG. 3, the power supply generates regulated the plus 8.5 volt supply voltage on conductor 112 and supplies the polarity-protected 12 volt voltage on conductor 210 and the direct voltage +V on conductor 208. A 12 volt DC voltage from a source such as a battery or a 12 volt power supply is applied to terminal 210'. A current flows through a fuse 301 is on/off switch 303 is on, applying the 12 volt voltage to +V conductor 208. +V conductor 208 is coupled by means of diode 319 and 27 ohm resistor 323 to external fan unit 43D by means of 27 ohm resistor 321 and by means of momentary switch 23 to internal fan unit 21B.

+V conductor 208 is also coupled by means of diode 305 and one ohm resistor 307 to the input of integrated circuit voltage regulator 311, which can be implemented by means of a National Semiconductor LM317T integrated circuit. The output of voltage regulator circuit 311 provides a regulated voltage of approximately 8.5 volts on conductor 112. Voltage ripple is reduced by bypass capacitors 309 and 313.

The operation of the Power Regulation Circuit of FIG. 3 is as follows. Power passes through fuse 301 and a doublepole, double-throw switch 303 and steering diode 319 to external fan unit 43B and internal fan unit 21B. A 10 microfarad capacitor 325 and 0.1 microfarad capacitor 326 across the motor terminals of fan unit 43B operate to eliminate RFI (radio frequency interference). Power passes to internal fan unit 21B only if cover switch 23 is closed. Cover switch 23 is only closed when the cover 9 of thermoelectric environmental chamber 1 is closed. Internal fan unit 21B then draws air from the top of the thermal compartment 13 through shroud 21, forcing it through the fins 29' of internal heat exchanger 29 into the bottom of the testing compartment, as indicated by arrows 25 and 27 in FIG. 1, producing uniform temperature in thermal compartment 13 when cover 9 is closed.

Power is also applied through steering diode 305 and resistor 307 to the input of voltage regulator 311. Voltage 311 is adjusted to produce an output voltage of 8.5 volts on conductor 112.

The +V voltage on conductor 208 is applied to the control relays 227, 229 and 230 which control switching of current through the thermoelectric module 245.

Referring now to FIGS. 2A and 2B, switch S2 is used to select the ten's digit of a selected desired temperature, and switch S1 is used to set the unit's digit of the selected desired temperature of the interior temperature chamber. Thus, switches S2 and S1 enable the user to digitally select any temperature from −10 degrees centigrade to +79 degrees centigrade in the described embodiment of the invention. Switches S1 and S2 operate by shorting out appropriate portions of the two resistor groups 105 and 107, which together determine a feedback current for operational amplifier 101. Since operational amplifier 101 in operation causes the voltage V1 to assume a level such that the voltage on input 101A is equal to the threshold voltage on conductor 101B, the feedback current is determined by the settings of switches S1 and S2, thus, those switches establish the level of voltage V1. The feedback current flows in the direction indicated by arrow 106.

Voltage V1 on conductor 101C is applied to the negative input of comparator 113 and represents the upper end of a small "temperature range" which will be subsequently explained. The feedback current flows through 51 ohm resistor 107C, thereby producing a voltage V3 on conductor 126 that is slightly lower voltage than V1. This voltage is applied to the positive input 109A of comparator 109, and represents a temperature that is approximately two thirds of a degree lower than the temperature represented by V1. The feedback loop current also flows through 51 ohm resistor 107B, producing a voltage V4 on conductor 128. Voltage V4 represents a temperature that is approximately two thirds of a degree lower than the temperature represented by V3, and is applied to positive input 111A of comparator 111.

The feedback loop current also flows through 51 ohm resistor 107A' producing a voltage V5 on conductor 107C'. Voltage V5 represents a temperature which is approximately two thirds of a degree lower than the temperature represented by V4, and is applied to the positive input 115A of comparator 115.

The voltage V2 produced on conductor 116 by operational amplifier 119 represents the actual temperature inside the testing compartment of environmental chamber 1. The function of comparators 109, 111, 113 and 115 is to compare the temperature in thermal compartment 13 to the desired temperature selected by means of switches S2 and S1 and to produce corresponding signals on conductors 109B, 111B, 113A, and 115A indicating whether the actual temperature in the temperature testing compartment is more than one third of a degree above the selected temperature, one third of a degree below the selected temperature, two thirds of a degree above the selected temperature, and two thirds of a degree below the selected temperature, respectively.

Since the total resistance of the feedback loop varies as a result of varying the settings of switches of S2 and S1, the voltage drop across each of resistors 107A, 107B, and 107C vary proportionately to the total feedback resistance. This allows a comparison between voltages which represent upper and lower limits of a temperature range and the voltage representing the actual temperature inside the testing chamber.

Note that the operational amplifier 119, in conjunction with 0.01 microfarad capacitor 119A' and 43 kilohm resistor 119B function as a high impedance buffer and low pass filter that reproduce the voltage on conductor 119A on conductor 116.

The outputs of comparators 109, 111, etc. produce an output of either zero volts or +8.5 volts, depending upon whether their respective positive inputs exceed or are less than V2. The voltages of the four conductors 109B, 111B, 113A and 115A contain all the information that is needed for control of the thermoelectric module 245 and indicator light emitting diodes 137, 141, and 145. Gates 127, 129, 131, 133, and 135 comprise a decoding system which decodes the signals on conductors 113A and 115A to control light emitting diode 137, which indicates whether the actual temperature is more than approximately two thirds of a degree over the selected temperature, light emitting diode 141, which indicates whether the actual temperature is more than two thirds of a degree below selected temperature, and light emitting diode 145, which indicates whether the actual temperature is within approximately two thirds of a degree of the selected temp. The BLINK signal on conductor 122 is gated with the control signal on conductor 113A by NOR gate 127 to cause light emitting diode 137 to blink approximately once per second if the signal on conductor 113A is at a "zero" level. The BLINK signal is also gated with the signal produced by logical NANDing of the signals on conductors 113A and 115A by means of NOR gate 133 to cause light emitting diode 141 to blink approximately once per second if the actual temperature is more than approximately two thirds of a degree below the selected temp. If the level on conductor on 115A is logical "zero" and the level on conductor 113A is a logical "one", then NOR gate 135 produces a logical "one" at its output, which indicates that the actual temperature is within approximately two thirds of a degree of the selected desired temperature, turning light emitting diode 145 on.

The digital signals A and B on conductors 109B and 121A, respectively, represent the condition of the actual temperature in the test chamber as indicated by the following truth table.

| Actual Temperature in the Chamber | A | B |
|---|---|---|
| Too Hot | 0 | 1 |
| Just Right | 1 | 1 |
| Too Cold | 1 | 0 |

NAND gates 201, 203, 205, and 207 decode the digital signals A and B to produce signals which drive relays 227, 229, and 230, which relays control application of power to thermoelectric module 245. If the actual temperature is within the "just right" zone (i.e., within approximately one-third of a degree of the selected desired temperature), relay 227 will be "off". If A and B indicate that the actual temperature in the test chamber is too hot or too cold, relays 229 and 230 will switch to control the direction of current through thermoelectric module 245 to cause it to either cool the interior of environmental chamber 1 or heat the interior thereof, respectively, to bring the actual temperature back to within approximately one-third of a degree of the selected desired temperature.

Previously mentioned light emitting diodes 241 and 243 indicate whether the thermoelectric module 245 is presently cooling or heating the interior of environmental chamber 1, as can be readily seen from FIG. 2B.

Use of the three relay arrangement shown in FIGS. 2A and 2B avoids any "short circuit" thermal path through thermoelectric module 245 when the actual temperature is within the above mentioned "just right zone" (i.e., when A equals a logical "one" and B equals a logical "one"). Those skilled in the art will realize that any low impedance path between the positive and negative terminals of thermoelectric module 245 will cause it to act as a thermal short circuit if thermoelectric module 245 is not operating in either a heating or cooling mode.

When A and B are both logical "ones", relay 227 is in the configuration shown in FIG. 2B. If either A or B is a logical "zero", relay wiper 227D contacts conductor 227B, connecting relays 229 and 230 to the +V voltage on conductor 208, unless the temperature of thermistor 220 exceeds 70 degrees centrigrade.

Note that if the thermoelectric module is capable of maintaining the actual temperature in a testing chamber within the range of ±one third of a degree of the selected desired temperature, the "over temperature" light emitting diode 137 and the "under temperature" light emitting diode 141 will be off, and the "on temperature" light emitting diode 145 will be steadily on. For example, if we assume that the actual temperature in the chamber is more than approximately two thirds of a degree above the temperature selected by S1 and S2, then V2 will be greater than V1, V3, V4 and V5 and conductors 109B, 121A, 101B, 113A, and 115A will be at zero volts. Then A will be a "zero" and B will be a "one". Thermoelectric module 245 will be coupled between ground conductor 120 and +V conductor 108 by relays 229 and 230 to cause current to flow from its positive to its negative terminal, thereby cooling the interior of the environmental chamber 1.

The logical "zero" on conductor 113A is logically ANDed with the signal BLINK by NOR gate 127, causing "over temperature" light emitting diode 137 to blink.

Next, as soon as the chamber temperature falls below approximately two thirds of a degree above the temperature selected by switches S1 and S2, temperature sensor unit 117 causes V2 to assume a value between V1 and V3, causing the voltage on conductor 113A to be a logical "one". This disables the signal BLINK, and "over temperature" light emitting diode 137 turns off and remains off. Gate 131 inverts the logical "one" on conductor 113A, producing a logical "zero" at one input of NOR gate 135. Since the level on conductor 115A is also a logical "zero", the "on temperature" light emitting diode 145 is turned on, indicating that the thermal compartment temperature is within the ± two thirds of a degree range about the selected temperature. However, thermoelectric module 245 continues to cool the chamber until V2 falls further to a value between V3 and V4. This causes a logical "one" to be produced on conductor 111B. Since a logical "zero" is present on conductor 109B, NAND gate 121 continues to produce a logical "one" on conductor 121A. Therefore, thermoelectric module 245 continues to cool the temperature in thermal compartment 13, and the temperature therein continues to fall until V2 is less than V4 but greater than V5, causing comparaor 111 to produce a logical "one" on conductor 111B. This causes a logical "zero" to be produced on conductor 121A since A is still a logical "one". This causes a logical "one" to be produced at the output of NAND gate 205, turning on transistors 215 and 217, so that relays 229 and 230 are turned on. Note that NAND gates 205 and 207 form a latch that stores the last direction of current flow in thermoelectric module 245. This reverses the direction of current through thermoelectric module 245, causing it to begin to heat thermal compartment 13. This also causes light emitting diode 243 to turn on and light emitting diode 241 to turn off.

Finally, if the temperature in thermal compartment 13 continues to fall despite the fact that thermoelectric module 245 is operating in the heating mode, such that V2 is less than V5, the voltage on conductor 115A becomes a logical "one". This causes the output of NAND gate 129 to be a "zero", since conductor 113A is at a logical "one", enabling the signal BLINK to alternately turn light emitting diode 141 to blink, indicating that the temperature in the chamber is more than approximately two thirds of a degree below the selected temperature. The logical "one" on conductor 115A produces a logical "zero" at the base of transistor 147, turning transistor 147 off and turning off "on temperature" light emitting diode 145.

Thus, the described circuit has the capability of producing a voltage which models exactly a Kelvin temperature sensor and the desired temperature is accurately programmable or settable by means of a pair of simple digital switches.

Note that the latch formed by NAND gates 205 and 207 only changes state if the chamber temperature deviates by more than approximately one third of a degree from the selected desired temperature. This prevents relays 229 and 230 from constantly switching back and forth.

Note that the external fan unit 43B runs constantly in order to ensure that the temperature of external heat exchanger 37 is always as nearly as possible equal to the ambient outside temperature. This enables the most rapid, efficient response of the control circuitry 110 when the actual temperature in the thermal compartment deviates from within approximately one third of a degree centigrade from the desired temperature selected by means of digital switches S1 and S2.

It should be noted that it is important in the described embodiment of the invention that solid state temperature sensor 117 be located between and/or slightly below the lower ends of fins 29', as indicated in FIG. 1, so that the temperature of the recirculated air is sensed as soon as the air is exhausted from the bottom portions of fins 29'. Solid state temperature sensor 117 can be implemented by means of a National Semiconductor LM334 solid state temperature sensing device.

It should be understood that the exact values of resistor 118A (43.2 kilohms), resistor 118B (0–2 kilohms), resistor 108' (25.5 kilohms), resistor 108 (0–2 kilohms), and the values of the 100 ohm resistors in group 105 and the 1 kilohm resistors in group 107 are not critical. Solid state temperature sensor 117 produces a current which varies linearly with temperature. Therefore, resistors 118A and 118B can be selected to provide a satisfactory linear variation with temperature at the positive input of operational amplifier 119 over the temperature range from −10 degrees centigrade to +79 degrees centigrade. The value of the voltage set on conductor 101B (the positive input of operational amplifier 101) and the values of resistors 108' and 108 and the other resistors in the feedback loop are selected so that as the temperatures selected by switches S1 and S2 vary between −10 degrees and +79 degrees C., V1 varies in the same fashion as V2 varies for the same corresponding actual temperatures in the temperature chamber 13. Calibration resistor 108B can be "fined tuned" to produce exactly the correct voltage on conductor 119A for each thermoelectric environmental chamber to account for slight differences between different solid state temperature sensors 117. Slight variations in the feedback resistances can be compensated for by adjustment of resistor 108.

In the described embodiment of the invention, the thickness of the urethane insulation layer in the walls, bottom, and cover is approximately 3.8 centimeters.

The described embodiment of the invention provides a high reliability, low power, high precision environmental chamber which is rugged, lightweight, portable, and operates from ordinary 12 volt automobile batteries, and yet can be profitably sold for less than $500.00 at the present time. The device only weighs approximately 18 lbs. and can be easily carried with one hand. By providing digital slide switches, the precise desired temperature can be selected with a high degree of accuracy. By manipulation of switches S1 and S2 and observation of temperature indicating lights 43A, 43B and 43C, the actual temperature in thermal chamber 13 can be readily ascertained with a high degree of precision, thereby often obviating the need for use of a separate, expensive precision temperature probe.

Because of the highly insulating and because of the high efficiency of the thermoelectric heat pumping device and the control circuitry, the power consumption is so low that the described embodiment of the invention can easily be used in field operations and in applications wherein low energy consumption is necessary.

While the invention has been described with reference to a particular embodiment thereof, those skilled in the art will be able to make various modifications to the disclosed embodiment of the invention without department from the true spirit and scope of the invention.

I claim:

1. Circuitry for controlling a solid state thermoelectric device in a thermoelectric environmental chamber, said solid state thermoelectric device being in thermal communication with an internal heat exchanger disposed inside a thermal compartment of said thermoelectric environmental chamber and an external heat exchanger disposed outside of said thermal compartment, said circuitry comprising in combination:
   a. temperature selecting means for digital selecting of a temperature that is desired to be maintained in said thermal compartment;
   b. first means responsive to said temperature selecting means for producing a first current representative of said selected temperature;
   c. second means responsive to said first current for producing a first voltage representative of a first upper range limit of said selected temperature;
   d. third means responsive to said first current for producing a second voltage representative of a first lower range limit for said selected temperature;
   e. first temperature sensing means disposed in said compartment for sensing an actual temperature in said thermal compartment and producing a third voltage representative of said actual temperature;
   f. comparison means for comparing said third voltage to said first and second voltages to produce first information indicating whether said actual temperature is above said first upper range limit or below said first lower range limit;
   g. fourth means responsive to said first information for producing a first control signal;

h. first switching means responsive to said first control signal for
   i. coupling a first terminal of said solid state thermoelectric device to a first supply voltage conductor and,
   ii. coupling a second terminal of said solid state thermoelectric device to a second supply voltage conductor,
   if said third voltage is greater than said first voltage;
i. second switching means responsive to said first control signal for,
   i. coupling said second terminal to said first supply voltage conductor and
   ii. coupling said first terminal to said second supply voltage conductor
   if said third voltage is less than said second voltage; and
j. first temperature indicating means responsive to said first temperature sensing means for producing a perceivable indication of said actual temperature.

2. The circuitry of claim 1 further including second temperature sensing means for sensing a temperature of said external heat exchanger and producing a fourth voltage representative of a temperature of said external heat exchanger, second comparison means for comparing said fourth voltage to a fifth voltage representative of an upper limit temperature of said external heat exchanger and producing a second control signal if said fourth voltage exceeds said fifth voltage, and third switching means coupled to said second comparison means for electrically disconnecting said second supply voltage conductor from a voltage source if said fourth voltage exceeds said fifth voltage, in order to prevent overheating of said external heat exchanger.

3. The circuitry of claim 1 wherein said first information signal also indicates whether said actual temperature is between said first upper range limit and said first lower range limit, said circuitry including fifth means responsive to said first information signal for producing a second control signal, and third switching means responsive to said second control signal for electrically disconnecting said second supply voltage conductor from a voltage source if said actual temperature is between said first upper range limit and said first lower range limit.

4. The circuitry of claim 1 wherein said temperature selecting means includes a first digital switch for selecting the ten's digit of said desired temperature and a second digital switch for selecting the unit's digit of said desired temperature.

5. The circuitry of claim 4 wherein said first means includes a first operational amplifier, said second means includes a first resistive means responsive to said first digital switch and a second resistive means responsive to said second digital switch, said first operational amplifier having a feedback network means including said first and second resistive means for adjusting said first current in response to said first and second digital switches.

6. The circuitry of claim 5 wherein said first temperature sensing means includes a solid state temperature sensing unit.

7. The circuitry of claim 6 further including calibrating means coupled to said first temperature sensing means for adjusting said third voltage to a level such that said third voltage precisely corresponds to said actual temperature.

8. The circuitry of claim 1 including fifth means responsive to said first current for producing a fourth voltage representative of a second upper range limit of said desired selected temperature, sixth means responsive to said first current for producing a fifth voltage representative of a second lower range limit of said selected desired temperature, said comparison means also comparing said third voltage to said fourth and fifth voltages to produce a second information signal indicating whether said actual temperature is above said second upper limit range or below said second lower range limit, said first temperature indicating means including first lamp means and second lamp means, said circuitry including third switching means responsive to said second information for turning on first lamp means if said third voltage is greater than said fifth voltage and fourth switching means responsive to said second information for turning on said second lamp means if said third voltage is less than said fifth voltage.

9. The circuitry of claim 8 wherein said first upper range limit is closer to said desired selected temperature than said second upper range limit and said first lower range limit is closer to said desired selected temperature than said second lower range limit.

10. The circuitry of claim 9 further including seventh means responsive to said comparison means for determining whether said third voltage is between said fourth and fifth voltages.

11. The circuitry of claim 10 wherein said circuitry includes third indicating means responsive to said seventh means for indicating when said actual temperature is between said second upper range limit and said second lower range limit.

12. The circuitry of claim 11 wherein said third indicating means includes third lamp means and said circuitry includes fifth switching means responsive to said seventh means for turning said lamp on if said actual temperature is between said second upper range limit and said second lower range limit.

* * * * *